(12) United States Patent
Kaiser

(10) Patent No.: US 11,407,147 B1
(45) Date of Patent: Aug. 9, 2022

(54) VAPOR CONDENSATION THERMOPLASTIC PARTS FINISHING

(71) Applicant: Entropic Systems, Inc., Edmonds, WA (US)

(72) Inventor: Robert Kaiser, Edmonds, WA (US)

(73) Assignee: Entropie Systems, Inc., Edmonds, WA (US)

( * ) Notice: Subject to any disclaimer, the term of this patent is extended or adjusted under 35 U.S.C. 154(b) by 0 days.

(21) Appl. No.: 16/897,888

(22) Filed: Jun. 10, 2020

(51) Int. Cl.
*B29C 35/02* (2006.01)
*B29C 35/16* (2006.01)

(52) U.S. Cl.
CPC .............. *B29C 35/02* (2013.01); *B29C 35/16* (2013.01)

(58) Field of Classification Search
CPC ................................ B29C 35/02; B29C 35/16
See application file for complete search history.

(56) References Cited

U.S. PATENT DOCUMENTS

| | | | |
|---|---|---|---|
| 3,437,727 A | 4/1969 | Boyhan et al. | |
| 3,737,499 A | 6/1973 | Kamena | |
| 4,260,873 A | 4/1981 | Simmonds | |
| 4,302,418 A * | 11/1981 | Cullis | B05D 3/10 264/341 |
| 4,594,311 A | 6/1986 | Frisch et al. | |
| 4,976,813 A | 12/1990 | Salensky et al. | |
| 5,045,141 A | 9/1991 | Salensky et al. | |
| 5,059,359 A | 10/1991 | Hull et al. | |
| 6,021,358 A | 2/2000 | Sachs | |
| 8,075,300 B2 | 12/2011 | Zinnie | |
| 8,123,999 B2 | 2/2012 | Priedeman, Jr. et al. | |
| 2005/0173838 A1* | 8/2005 | Priedeman | B33Y 10/00 264/401 |

(Continued)

OTHER PUBLICATIONS

"Dyemansion Powerfuse S: The Clean Vapor Technology Challenging Injection Molding," DyeMansion GmbH and DyeMansion North America Inc., <https://dyemansion.com/en/products/powerfuse-s/#1573652917489-5732d511-654d157407246648015740754826­73>, retrieved from the Internet on Jun. 10, 2020, pp. 1-5.

(Continued)

*Primary Examiner* — Ryan M Ochylski
(74) *Attorney, Agent, or Firm* — Cesari and McKenna, LLP; James A. Blanchette

(57) ABSTRACT

In various embodiments, a vapor condensation thermoplastic part finishing technique is provided that smooths and ensures color saturation of thermoplastic parts. The technique uses nonhazardous vapor condensation to rapidly heat a thermoplastic part to a temperature higher than its melting temperature. The part then may be cooled to a temperature lower than its melting temperature (and preferable lower than its glass-transition temperature. In some cases, evaporation may be employed to rapidly cool the part. Condensation and, where applicable evaporation, may be promoted by pressure changes to the nonhazardous vapor (e.g., increasing pressure to above atmospheric pressure and then decreasing pressure back to atmospheric pressure), exposure of the part to a separately-heated cloud of nonhazardous vapor (e.g., moving the part into and then out of the separately-heated cloud or injecting and then stopping injection of separately-heated vapor), or by other techniques.

27 Claims, 16 Drawing Sheets

(56) References Cited

U.S. PATENT DOCUMENTS

2009/0321972 A1* 12/2009 Zinniel .................. B33Y 40/00
              264/37.13
2012/0017946 A1* 1/2012 Yanagawa ............... B08B 3/022
              134/26
2014/0060587 A1 3/2014 Ozeki et al.

OTHER PUBLICATIONS

"PostPro3D™," Additive Manufacturing Technologies Limited, <https://amtechnologies.com/systems/postpro3d>, 2020, retrieved from the Internet on Jun. 10, 2020, pp. 1-3.

* cited by examiner

| Abs. Pressure | Temperature | | Spec. Volume, ft3/lb | | Enthalpy, BTU/lb | | Heat of Condensation, BTU/lb |
|---|---|---|---|---|---|---|---|
| psi | °F | °C | Liquid | Vapor | Liquid | Vapor | |
| 1 | 101.74 | 39 | 0.0161 | 333.6 | 69.7 | 1106 | 1036.3 |
| 14.7 | 212 | 100 | 0.0167 | 26.8 | 180.1 | 1150.4 | 970.3 |
| 30 | 250.3 | 121 | 0.0170 | 13.746 | 218.2 | 1164.1 | 945.9 |
| 60 | 292.7 | 145 | 0.0174 | 7.175 | 262.1 | 1177.6 | 915.5 |
| 90 | 320.2 | 160 | 0.177 | 4.896 | 290.6 | 1185.3 | 894.7 |
| 120 | 341.5 | 172 | 0.0179 | 3.728 | 312.4 | 1190.4 | 878.0 |
| 250 | 400.95 | 205 | 0.0187 | 1.844 | 376.0 | 1201.1 | 825.1 |
| 350 | 431.72 | 222 | 0.0191 | 1.326 | 409.7 | 1203.9 | 794.2 |

| Heat Transfer Coefficient, h, W/(m²*K) | | |
|---|---|---|
| natural convection (buoyancy-driven) | | |
| | gases | 3-20 |
| | water | 100-600 |
| | boiling water | 1,000-20,000 |
| forced convection | | |
| | gases | 10-200 |
| | oils | 50-500 |
| | water | 500-20,000 |
| condensing steam | | 1,000-100,000 |

FIG. 3

| Property | Units | Material | | | | |
|---|---|---|---|---|---|---|
| | | Nylon 6-6 | Nylon 6 | Nylon 12 | ABS | SS-304, SS-316 |
| Specific Gravity | g/cm³ | 1.07 | 1.08 | 1.02 | 1.08 | 7.8 |
| | lb/ft³ | 66.8 | 67.4 | 63.6 | 67.4 | 486.7 |
| Melting Temperature | °C | 259 | 218 | 178 | 105 | |
| | °F | 498 | 424 | 352 | 221 | |
| Enthalpy of Fusion | cal/gram | 54.0 | 55.0 | 58.6 | 49.5 | |
| | BTU/lb | 43.2 | 44.0 | 46.8 | 39.6 | |
| Specific Heat | cal/g-°C | 0.399 | 0.406 | 0.406 | 0.34 | 0.12 |
| | BTU/lb-°F | 0.399 | 0.406 | 0.406 | 0.34 | 0.12 |
| Thermal Conductance | W/mK | 0.25 | 0.24-0.28 | 0.26 | 0.3 | 16.6 |
| | BTU/hr-ft²-°F/ft | 0.14 | 0.14-0.16 | 0.15 | 0.17 | 9.4 |

FIG. 4

| Tank Pressure, psia | Compression Ratio | Relative Volume | Vapor Content @ Tsat lbs/ft3 | Calculated water content in compressed volume, lbs/ft3 | Amount of water condensed, lbs/ft3 | Percent of water condensed | Calculated Temperature of Compressed Volume, °C |
|---|---|---|---|---|---|---|---|
| 14.7 | 1.00 | 1.00 | 3.73E-02 | 3.73E-02 | 0.00E+00 | 0.0% | 100 |
| 30 | 2.04 | 0.49 | 7.27E-02 | 7.61E-02 | 3.40E-03 | 9.1% | 121 |
| 60 | 4.08 | 0.25 | 1.39E-01 | 1.52E-01 | 1.29E-02 | 34.6% | 145 |
| 90 | 6.12 | 0.16 | 2.04E-01 | 2.28E-01 | 2.42E-02 | 64.9% | 160 |
| 120 | 8.16 | 0.12 | 2.68E-01 | 3.05E-01 | 3.64E-02 | 97.4% | 172 |
| 30 | 1.00 | 1.00 | 7.27E-02 | 7.27E-02 | 0.00E+00 | 0.0% | 121 |
| 60 | 2.00 | 0.50 | 1.39E-01 | 1.45E-01 | 6.12E-03 | 8.4% | 145 |
| 90 | 3.00 | 0.33 | 2.04E-01 | 2.18E-01 | 1.40E-02 | 19.2% | 160 |
| 120 | 4.00 | 0.25 | 2.68E-01 | 2.91E-01 | 2.28E-02 | 31.3% | 172 |
| 60 | 1.00 | 1.00 | 1.39E-01 | 1.39E-01 | 0.00E+00 | 0.0% | 145 |
| 90 | 1.50 | 0.67 | 2.04E-01 | 2.09E-01 | 4.81E-03 | 3.5% | 160 |
| 120 | 2.00 | 0.50 | 2.68E-01 | 2.79E-01 | 1.05E-02 | 7.5% | 172 |
| 250 | 4.17 | 0.24 | 5.42E-01 | 5.81E-01 | 3.84E-02 | 27.6% | 205 |
| 90 | 1.00 | 1.00 | 2.04E-01 | 2.04E-01 | 0.00E+00 | 0.0% | 160 |
| 120 | 1.33 | 0.75 | 2.68E-01 | 2.72E-01 | 4.09E-03 | 2.0% | 172 |
| 250 | 2.78 | 0.36 | 5.42E-01 | 5.67E-01 | 2.51E-02 | 12.3% | 205 |
| 350 | 3.89 | 0.26 | 7.54E-01 | 7.94E-01 | 4.02E-02 | 19.7% | 222 |

FIG. 5

| Step | Description | Boiler | Tank | Cover | Vac Pump | V-1 | V-2 | V-3 | V-4 | V-5 | V-6 | V-7 | Piston |
|---|---|---|---|---|---|---|---|---|---|---|---|---|---|
|  | Off-Line | Off | Closed | In place | Off | Closed | Closed | Closed | Closed | Closed | Closed | Closed | Down |
|  | Stand-by | on | Closed | In place | Off | Closed | Closed | Closed | open | open | Closed | open | Down |
| 1 | Load Parts | on | Open | Removed | Off | Closed | Closed | Closed | open | Closed | Closed | open | Down |
| 2 | Close Tank | on | Closed | In place | Off | Closed | Closed | Closed | Closed | Closed | Closed | Closed | Down |
| 3 | Evacuate Tank | on | Closed | In place | on | open | Closed | Closed | Closed | Closed | Closed | Closed | Down |
| 4 | Preheat Tank | on | Closed | In place | Off | Closed | open | Closed | Closed | Closed | open | Closed | Up |
| 5 | Polish Parts | on | Closed | In place | Off | Closed | Closed | open | Closed | Closed | Closed | Closed | Down |
| 6 | Cool & Dry Parts | on | Closed | In place | Off | Closed | Closed | Closed | open | Closed | Closed | open | Down |
| 7 | Remove Parts | on | Closed | In place | Off | Closed | Closed | Closed | Closed | Closed | Closed | open | Down |

| Initial Conditions | | Compression Ratio | Final Conditions | | Amount of water condensed, lbs/ft3 | Percent Condensed Water | Heat of Condensation | |
|---|---|---|---|---|---|---|---|---|
| Pressure, psia | Temperature, °C | | Pressure, psia | Temperature, °C | | | BTU/lb | BTU/ft³ |
| 14.7 | 100 | 4.08 | 60 | 145 | 1.29E-02 | 34.6% | 915.51 | 11.83 |
| 30 | 121 | 4 | 120 | 172 | 2.28E-02 | 31.3% | 894.74 | 20.36 |
| 60 | 145 | 4.17 | 250 | 205 | 3.84E-02 | 27.6% | 825.10 | 31.70 |
| 90 | 160 | 3.89 | 350 | 222 | 4.02E-02 | 19.7% | 794.20 | 31.89 |

FIG. 9

| Property | Units | Material | |
|---|---|---|---|
| | | Nylon 12 | SS-304, SS-316 |
| Specific Gravity | g/cm³ | 1.02 | 7.8 |
| | lb/ft³ | 63.6 | 486.7 |
| Melting Temperature | °C | 178 | |
| | °F | 352 | |
| Enthalpy of Fusion | cal/gram | 58.6 | |
| | BTU/lb | 46.8 | |
| Specific Heat | cal/g-°C | 0.406 | 0.12 |
| | BTU/lb-°F | 0.406 | 0.12 |
| Thermal Conductance | W/mK | 0.26 | 16.3 |
| | BTU/hr-ft²-°F | 0.15 | 9.4 |
| Assumed Dimensions | | Part | Reactor |
| Shape | | Cylinder | Cylinder |
| Outer Diameter, cm | | 20 | 30 |
| Inner Diameter, cm | | | 29.4 |
| Length, cm | | 20 | 30 |
| Volume, cm3 | | 6280 | 1874 |
| Weight, g | | 6405.6 | 14614 |
| Surface area, cm2 | | 1570 | 13448 |
| Thickness of surface layer to be fused (OR HEATED), cm | | 1.00E-03 | 1.00E-02 |
| Volume of Surface Layer, cm3 | | 1.57 | 34.48 |
| Weight of Surface Layer, g | | 1.60 | 268.94 |
| Energy requirements | | Part | Reactor |
| Heating layer to melt temp. | | | |
| T start, °C | | 145 | 145 |
| T melt, °C | | 178 | 178 |
| ΔT °C | | 33 | 33 |
| Energy, cal | | 21.46 | 1060.61 |
| | | | |
| Melting Layer, cal | | 93.77 | 0.00 |
| Total, cal | | 115.23 | 1060.61 |
| Total, BTU | | 0.46 | 4.21 |

FIG. 10

| Material | Melting Point | | Target B.P. Range of Process Liquid, °C | Commercial Inert Liquid with B.P.s in Target Range |
| --- | --- | --- | --- | --- |
| | °C | °F | | |
| | | | | |
| ABS | 105 | 221 | 120-150 | 3M Novec 7600 |
| PLA | 155 | 311 | 180-210 | Galden LS200 |
| Nylon 12 | 178 | 352 | 200-230 | Galden LS 215, 3M FC-70 |
| Nylon 6-12 | 180 | 356 | 200-230 | Galden LS 215, 3M FC-70 |
| Nylon 11 | 185 | 365 | 210-240 | Galden LS 230 |
| TPE | 202 | 395 | 220-250 | Galden HS 240 |
| Nylon 6-10 | 215 | 419 | 250-280 | Galden HS 260 |
| Nylon 6 | 218 | 424 | 250-280 | Galden HS 260 |
| ASA | 220 | 428 | 250-280 | Galden HS 260 |
| TPU | 230 | 446 | 260-290 | Galden HS 260 |
| Nylon 6-6 | 259 | 498 | 290-320 | Galden HS300 (projected) |
| PEEK | 343 | 649 | 370-400 | Galden HS400 (projected) |
| PEKK | 360 | 680 | 390-420 | Galden HS420 (projected) |
| PEI | 390 | 734 | 410-430 | Galden HS420 (projected) |

FIG. 11

VAPOR CONDENSATION THERMOPLASTIC PARTS FINISHING

BACKGROUND

Technical Field

The present disclosure relates generally to the finishing of plastic parts, and more specifically to techniques and apparatus for smoothing and ensuring color saturation of thermoplastic parts.

Background Information

The formation of parts from solid or particulate thermoplastics is common in a variety of types of industrial manufacturing. Thermoplastic parts may be formed using a wide variety of manufacturing processes, which include removing material from stock by mechanical action, such as machining; deforming stock by the application of force or pressure; melting stock and solidifying the resulting liquid in a mold (commonly referred to as "injection molding"); additive manufacturing that involves consolidating successively layers of material according to a computer aided design (CAD) model (commonly referred to as "three-dimensional (3D) printing"); among other processes.

Irrespective of the process used to manufacture a thermoplastic part, the part typically needs to possess certain visual and tactile characteristics. Such characteristics may be dictated by the part's function or by user expectations (i.e. the part needs to "look right" and "feel right").

One important visual and tactile characteristic is surface roughness. Surface roughness ($R_a$) plays an important role in determining how a part will appear and feel. It is quantified by the deviations in the direction of the normal vector of the actual surface of the part from its ideal form. If these deviations are large, the surface of the part is rough; if they are small, the surface is smooth. Some manufacturing processes can inherently provide smoother surfaces than others. For example, injection molding can provide surfaces on parts with a $R_a$ of 1 micrometer ($\mu m$) or less. In contrast, 3D printing often uses powders with a particle size distribution (PSD) of 10-90 $\mu m$, which usually leads to surfaces with an $R_a$ of 10 $\mu m$ or higher. This is a major competitive disadvantage for 3-D printing in applications where it competes with injection molding. However, even manufacturing processes that can inherently provide smoother surfaces do not universally do so. For example, the generally smooth surface of injection-molded parts may have scattered rough scars due to the presence of fixturing devices in the mold, the removal of sprues, or wear to the mold from ongoing use. Further, surface roughness may be introduced at later stages of manufacturing, as a result of parts handing, accident, and the like. Most thermoplastic parts are thereby subject to undesired surface irregularities of one sort or another.

Separate from surface roughness, color quality plays an important role in how a part appears. In particular, if color saturation is lacking, parts can have a hazy look, which distracts from their visual appeal. While this issue may occur in various manufacturing processes, it is particularly prevalent in 3D printing. In 3D printing, unconsolidated particles may adhere to molten particles at the interface that defines the surface of the part being consolidated. These unconsolidated particles may create a thin layer that scatters light, presenting the appearance of a different color, and thus altering the appearance of the part.

Manufacturers have explored a number of post-processing operations in attempts to address surface roughness and color quality of thermoplastic parts but have been met with challenges. A primary challenge is to be able to smooth the surface of the part and eliminate color-affecting material, without altering fine detail or mechanical properties of the part. A secondary challenge is to be able to do so in a manner that requires a minimum of worker and environmental safety apparatus. In particular, this is an issue for 3D printing. A widely touted benefit of 3D printing is that it may be performed in regular office space and other similar design environments. However, unlike typical manufacturing environments, such design environments generally do not have equipment and procedures in place to safely handle hazardous and flammable materials. If such materials are required for post-processing operations, one of the major benefits of 3D printing is lost. A tertiary challenge is to smooth the surface of the part and eliminate color-affecting material via a process that is expedient and relatively inexpensive to perform. Complicated operations that are slow and expensive are not practical for many types of manufacturing.

Existing post-processing operations generally fail to address one or more of the above-discussed challenges. Some existing post-processing operations involve manually trimming, machining or buffing parts to remove material, using various cutters, coated abrasives (e.g., sandpaper) or solution-born abrasives. However, such operations may alter fine detail, and often are slow and/or expensive.

Other existing post-processing operations involve the use of chemical vapors or liquids to smooth and provide gloss to a part by reflowing its surface (typically referred to as "solvent polishing"). There are two common techniques for solvent polishing. The first technique is to immerse the entire part in a bath of liquid plastic solvent for a period of time selected based on the identity of the solvent and the type of thermoplastic involved. The solvent from the bath penetrates the outer layer of the thermoplastic, thereby causing it to reflow. The second technique is to expose the part to a vaporized solvent. The vaporized solvent may be produced by heating a solvent, for example, in a heated bath disposed below the part. The hot solvent vapor melts the outer layer of the thermoplastic, causing it to reflow. While such operations may be relatively quick and inexpensive, the solvents required are often quite hazardous and flammable, and thereby unsuited for use in a typical design environment.

Accordingly, there is a need for an improved technique for smoothing and ensuring color saturation of thermoplastic parts that may address some or all of the above-described challenges.

SUMMARY

In various embodiments, a vapor condensation thermoplastic part finishing technique is provided that smooths and ensures color saturation of thermoplastic parts. The technique uses nonhazardous vapor condensation to rapidly heat a thermoplastic part to a temperature higher than its melting temperature. The part then may be cooled to a temperature lower than its melting temperature (and preferably lower than its glass-transition temperature). In some cases, evaporation may be employed to rapidly cool the part. Condensation and, where applicable evaporation, may be promoted by pressure changes to the nonhazardous vapor (e.g., increasing pressure to above atmospheric pressure and then decreasing pressure back to atmospheric pressure), exposure of the part to a separately-heated cloud of nonhazardous vapor (e.g., moving the part into and then out of the separately-heated cloud or injecting and then stopping injection of separately-heated vapor), or by other techniques. Because of the short duration of the heat spike and the low thermal conductivity of thermoplastic, the surface of the part heats, melts and reflows, improving its smoothness and color saturation, while the subsurface volume of the part remains at a substantially unchanged temperature, thereby avoiding distortion and/or degradation. Multiple cycles may be performed to achieve a desired level of smoothness and color saturation. Advantageously, the technique may be suited for a typical design environment, avoiding use of hazardous and flammable materials.

In one example embodiment, thermoplastic part finishing is performed by heating the surface of the thermoplastic part to a first temperature higher than a melting temperature of the thermoplastic part by condensing a non-hazardous vapor on the surface of the thermoplastic. The surface of the thermoplastic part is cooled to a second temperature lower than the melting temperature. One or more cycles of heating and cooling are performed until the thermoplastic part has at least one of a roughness or a color saturation that satisfies a predetermined requirement.

In another example embodiment that specifically utilizes pressure changes to the nonhazardous vapor, thermoplastic part finishing is performed using a reactor having a tank that holds the thermoplastic part and a cover that provides an airtight seal. One or more valved ports are disposed in the reactor, the one or more valved ports including a valved port that introduces a non-hazardous vapor into the tank. A movable piston of the reactor moves from a first position to a second position to compress the non-hazardous vapor in the tank to a first pressure sufficient to cause the non-hazardous vapor to condense on a surface of the thermoplastic part at a first temperature that is higher than a melting temperature of the thermoplastic part and thereby melt the surface of the thermoplastic part, and moves from the second position to the first position to decompress the non-hazardous vapor in the reactor to a second pressure sufficient to cause the condensed non-hazardous vapor on the surface of the thermoplastic part to evaporate and thereby cool the surface of the thermoplastic part to a second temperature lower than the melting temperature.

In yet another example embodiment system that specifically utilizes exposure of the thermoplastic part to separately-heated nonhazardous vapor, thermoplastic part finishing is performed using a reactor that includes a tank that holds the thermoplastic part that is open to atmosphere. The tank has a sump region in which a pool of nonhazardous liquid is disposed, and a vapor cloud region configured to hold a thermoplastic part. A heating assembly heats the non-hazardous liquid to create a nonhazardous vapor having a temperature sufficient to cause the vapor when exposed to the thermoplastic part in the vapor cloud region to condense on a surface of the thermoplastic part at a first temperature that is higher than a melting temperature of the thermoplastic part and thereby melt the surface of the thermoplastic part.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which:

FIG. 2 is a table showing properties of saturated water vapor, illustrating the release of a high level of energy (in BTU/lb) during condensation under various conditions;

FIG. 3 is a table showing estimated heat transfer coefficients for condensation of water vapor in comparison to various convection heat transfer rates;

FIG. 4 is a table showing selected properties of various example thermoplastics, illustrating that entropy of fusion, heat capacity and thermal conductivity is low in comparison to stainless steel;

FIG. 5 is a table showing properties of the adiabatic compression of water vapor, illustrating temperature increase together with partial condensation;

FIG. 8 is a table showing the status of components of the system of FIGS. 7A-7C in various system states;

FIG. 9 is a table showing the effect of steam pressure on operating temperatures and adiabatic heat generation in an example 1 cubit foot (ft$^3$) reactor with a 4× compression ratio;

FIG. 10 is a table showing estimated heat requirements for the example reactor of FIG. 9;

FIG. 11 is a table showing the melting point for various example thermoplastics, target temperate ranges based on such melting points and examples of commercially available liquids that have a boiling point suitable for the target range at atmospheric pressure;

DETAILED DESCRIPTION OF EXAMPLE EMBODIMENTS

Figure 1:
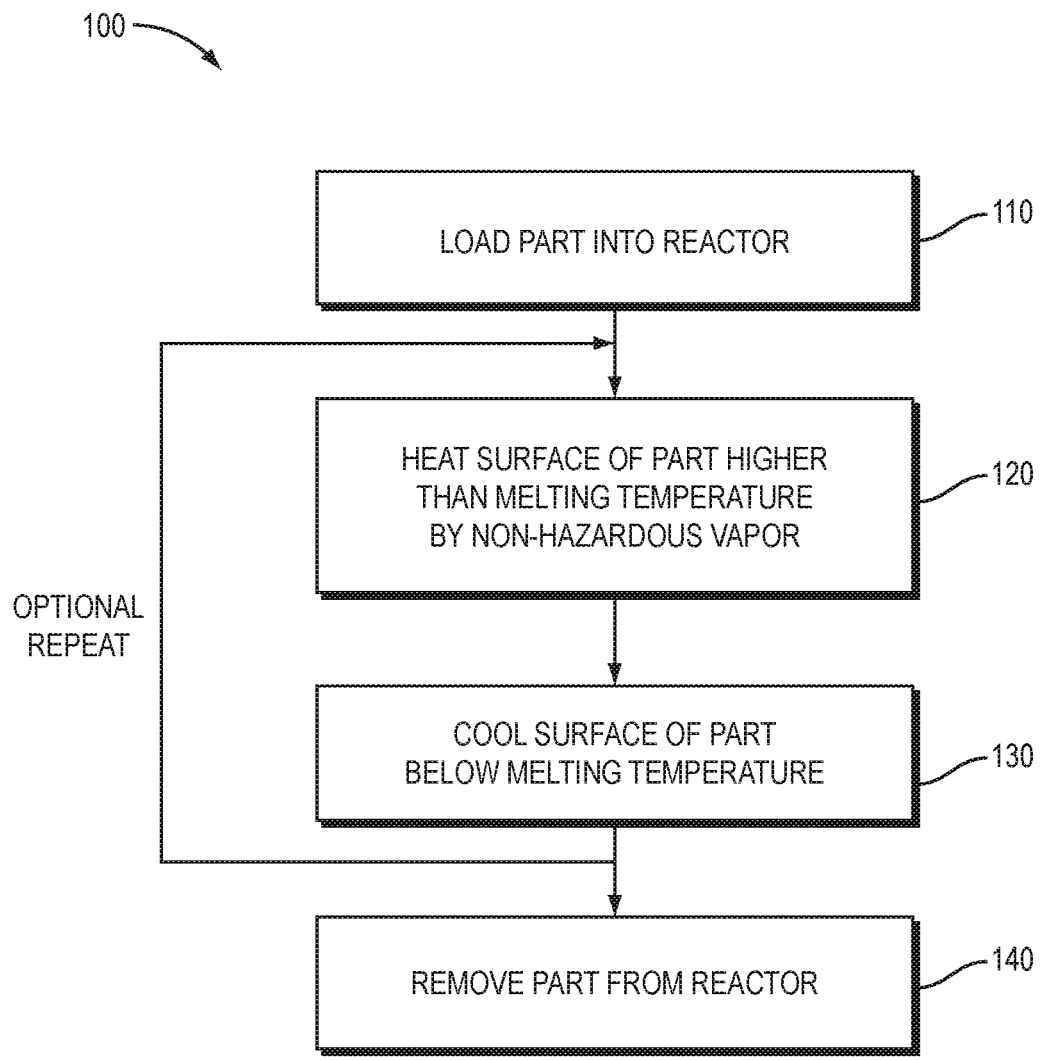
FIG. 1 is a flow diagram of an example high-level sequence of steps for vapor condensation thermoplastic part finishing.

FIG. 1 is a flow diagram of an example high-level sequence of steps 100 for vapor condensation thermoplastic part finishing. As used herein the term "part" should be interpreted broadly to include both an object that is a piece or component of a larger object and a stand-alone object that is in-and-of-itself a whole. The thermoplastic part may be made of any of a number of well-known thermoplastics, such as acrylonitrile butadiene styrene (ABS), nylon, polylactic acid (PLA), acrylonitrile styrene acrylate (ASA), polyether ether ketone (PEEK), polyether ether ketone ketone (PEKK), polyetherimide (PEI), thermoplastic elastomer (TPE), thermoplastic polyurethane (TPU), etc. The thermoplastic may have a melting temperature that is in a given range, for example a range from 50° C. to 400° C. Likewise, the non-hazardous vapor may be produced from any of a number of well-known non-hazardous liquids including water, a perfluorocarbon, a hydrocarbon ether, a perfluoropolyether, etc. Selection of a particular non-hazardous liquid may be based on a variety of factors depending on the embodiment. One factor may be the melting temperature of the particular thermoplastic being used (e.g., a thermoplastics with a high melting temperature may require a non-hazardous liquid with a high boiling point). Further, while vapor condensation thermoplastic part finishing may have particular advantages in manufacturing processes that involve 3D printing, it should be remembered that the thermoplastic part may be produced by any of a number of well-known manufacturing processes including machining, deforming, injection molding, etc.

At step 110, a user places a thermoplastic part into a reactor or a parts basket thereof. At step 120, the surface of the part is heated to a target temperature higher than its melting temperature by a non-hazardous vapor (e.g., water vapor, a perfluorocarbon vapor, a hydrocarbon ether vapor, a perfluoropolyether vapor, etc.) in the reactor condensing upon and heating the surface. As discussed in more detail below, the nonhazardous vapor may be caused to condense upon and heat the surface using any of a number of techniques depending on the implementation, including increasing pressure of nonhazardous vapor about the part to above atmospheric pressure so that it condenses on the cooler part, moving the part into a hot nonhazardous vapor cloud such that it condenses on the cooler part, injecting a hot nonhazardous vapor cloud about the part such that it condenses on the cooler part, or by other techniques. The surface of the thermoplastic part exposed to the hot condensed nonhazardous vapor rapidly heats, melts and reflows, improving its smoothness and color saturation. At step 130, the surface of the thermoplastic part is cooled to below its melting temperature (preferably below its glass-transition temperature). Cooling may be promoted in some implementations by evaporation of the non-hazardous vapor. As discussed in more detail below, evaporation may be promoted using any of a number of techniques depending on the implementation, including decompressing nonhazardous vapor about the part, removing the part to a cooler region away from hot nonhazardous vapor, ceasing injection of hot nonhazardous vapor so the part cools in place, or by other techniques. Steps 120 and 130 may be performed one or more times (i.e. just once or repeated) until a smoothness and/or color saturation of the part satisfies a predetermined design requirement. At step 140, the user removes the finished thermoplastic part from the reactor or parts basket thereof.

Vapor condensation thermoplastic part finishing may take advantage of the heat transfer kinetics for condensation of vapors to liquids, and the physical properties of thermoplastics. The condensation of the non-hazardous vapor to liquid (e.g., water vapor to liquid water, perfluorocarbon vapor to liquid perfluorocarbon, hydrocarbon ether vapor to liquid hydrocarbon ether, perfluoropolyether vapor to liquid perfluoropolyether, etc.) entails the release of a high level of energy. FIG. 2 is a table 200 showing properties of saturated water vapor, illustrating the release of a high level of energy (in BTU/lb) during condensation under various conditions. Further, the heat transfer coefficient for the condensation of many vapors (such as water vapor) is very high (e.g., much higher than the convective heat transfer rate of the equivalent flowing vapor or liquid). FIG. 3 is a table 300 showing estimated heat transfer coefficients for condensation of water vapor in comparison to various convection heat transfer rates. The result is that the energy rapidly released from condensation is transferred to the surface of the part enabling it to melt and reflow. However, the enthalpy of fusion of thermoplastic is quite low, as is its heat capacity. Further, the thermal conductivity of thermoplastic is low. FIG. 4 is a table 400 showing selected properties of various example thermoplastics, illustrating that enthalpy of fusion, heat capacity and thermal conductivity is low in comparison to stainless steel. The result is that energy imparted on the surface briefly is not effectively transferred to the subsurface volume, enabling the temperature of the subsurface volume to be maintained unchanged. It may be noted that these conditions generally cannot be attained if the part is formed from a material with high enthalpy of fusion and heat capacity because the subsurface volume would reach undesirable temperatures. Further, it should be remembered that while some thermoplastics (e.g., nylons) are degraded by long-term expose to high temperature, little degradation occurs over short time periods.

In a first example embodiment, condensation and, where applicable evaporation, may be promoted by pressure changes to the nonhazardous vapor. This may be performed by increasing pressure to above atmospheric pressure and then decreasing pressure back to atmospheric pressure. When saturated vapor is compressed under adiabatic conditions, an increase in temperature and a partial condensation vapor occurs. FIG. 5 is a table 500 showing properties of the adiabatic compression of water vapor, illustrating temperature increase together with partial condensation.

Figure 6:
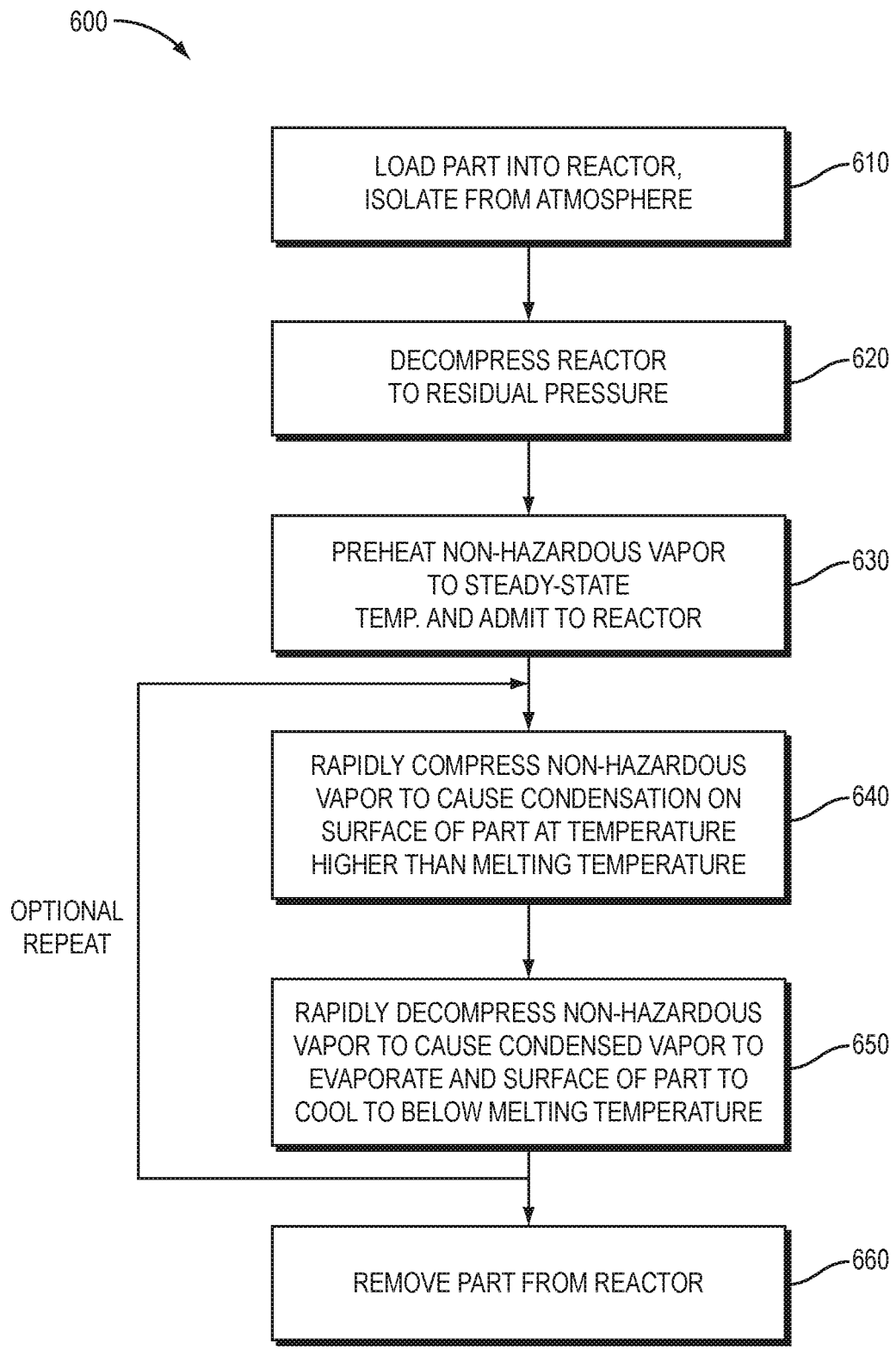
FIG. 6 is a flow diagram of an example high-level sequence of steps for vapor condensation thermoplastic part finishing according to a first embodiment that involves pressure changes.

FIG. 6 is a flow diagram of an example high-level sequence of steps 600 for vapor condensation thermoplastic part finishing according to a first embodiment that involves pressure changes. At step 610, a user loads a thermoplastic part into the reactor, and then isolates the reactor from atmosphere. At step 620, the reactor is decompressed (evacuated) to a residual pressure (e.g., a pressure of less than 10 mbar). At step 630, a nonhazardous vapor (e.g., water vapor, a perfluorocarbon vapor, a hydrocarbon ether vapor, a perfluoropolyether vapor, etc.) is preheated to a steady-state temperature lower than the melting temperature of the thermoplastic part and admitted into the reactor to be maintained therein at a steady-state pressure. As part of the preheating step 630, residual air in the reactor may be vented to atmosphere. At step 640, the non-hazardous vapor in the reactor is rapidly compressed from the steady-state pressure to a greater pressure sufficient to cause the non-hazardous vapor to condense on a surface of the thermoplastic part at a target temperature higher than its melting temperature. The surface of the thermoplastic part exposed to the hot condensed vapor rapidly heats, melts and reflows, improving its smoothness and color saturation. At step 650, the non-hazardous vapor in the reactor is rapidly decompressed (evacuated) to a pressure sufficient to cause the condensed nonhazardous vapor on the surface of the thermoplastic part to evaporate. The surface of the thermoplastic part rapidly cools to below its melting temperature (preferably below its glass-transition temperature) and dries. By executing steps 640 and 650 in rapid succession, the subsurface volume of the part remains at a substantially unchanged temperature through the heat spike on the surface, thereby avoiding distortion and/or degradation to the part. Steps 640 and 650 may be performed one or more times (i.e. just once or repeated) until a smoothness and/or color saturation of the part satisfies a predetermined design requirement. At step 660, the user removes the finished thermoplastic part from the reactor.

Figure 7A:
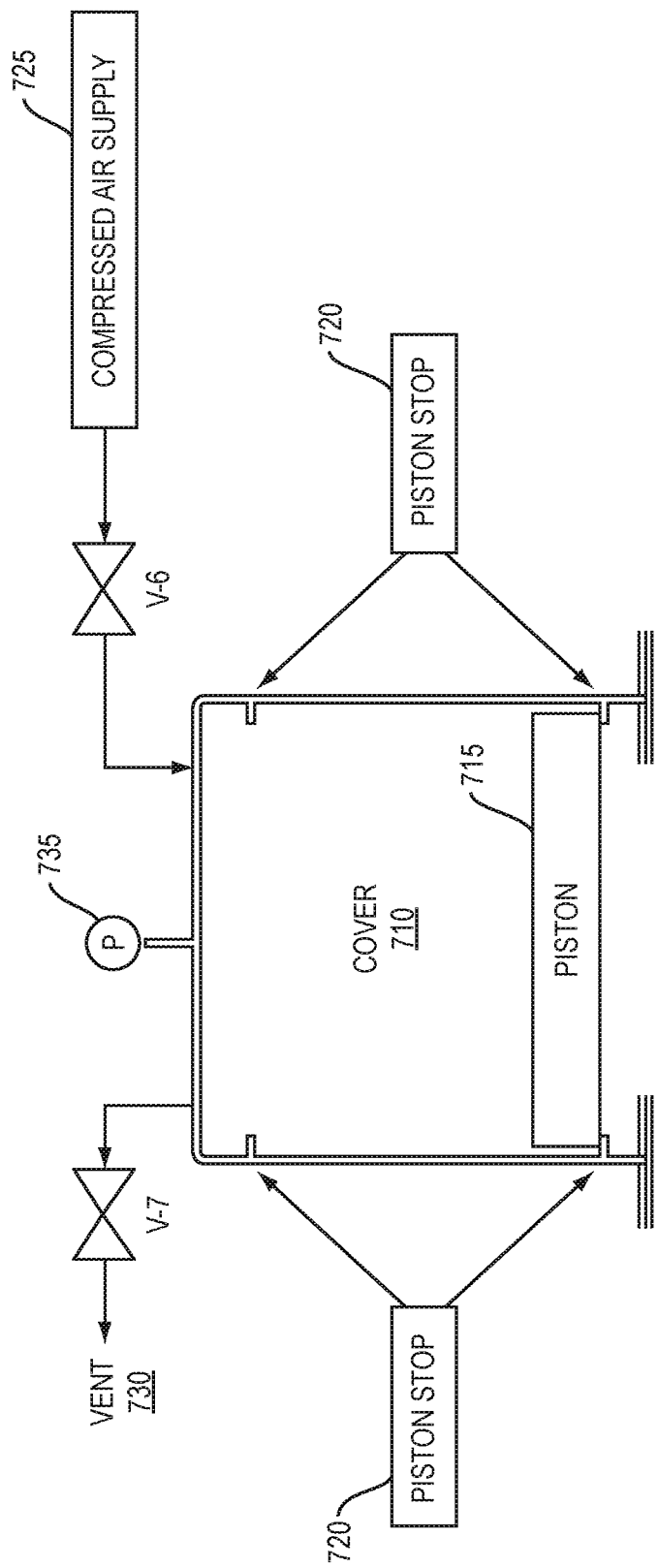
FIGS. 7A-7C are schematic diagrams of an example system for vapor condensation thermoplastic part finishing that may implement the sequence of steps of FIG. 6.
Figure 7B:
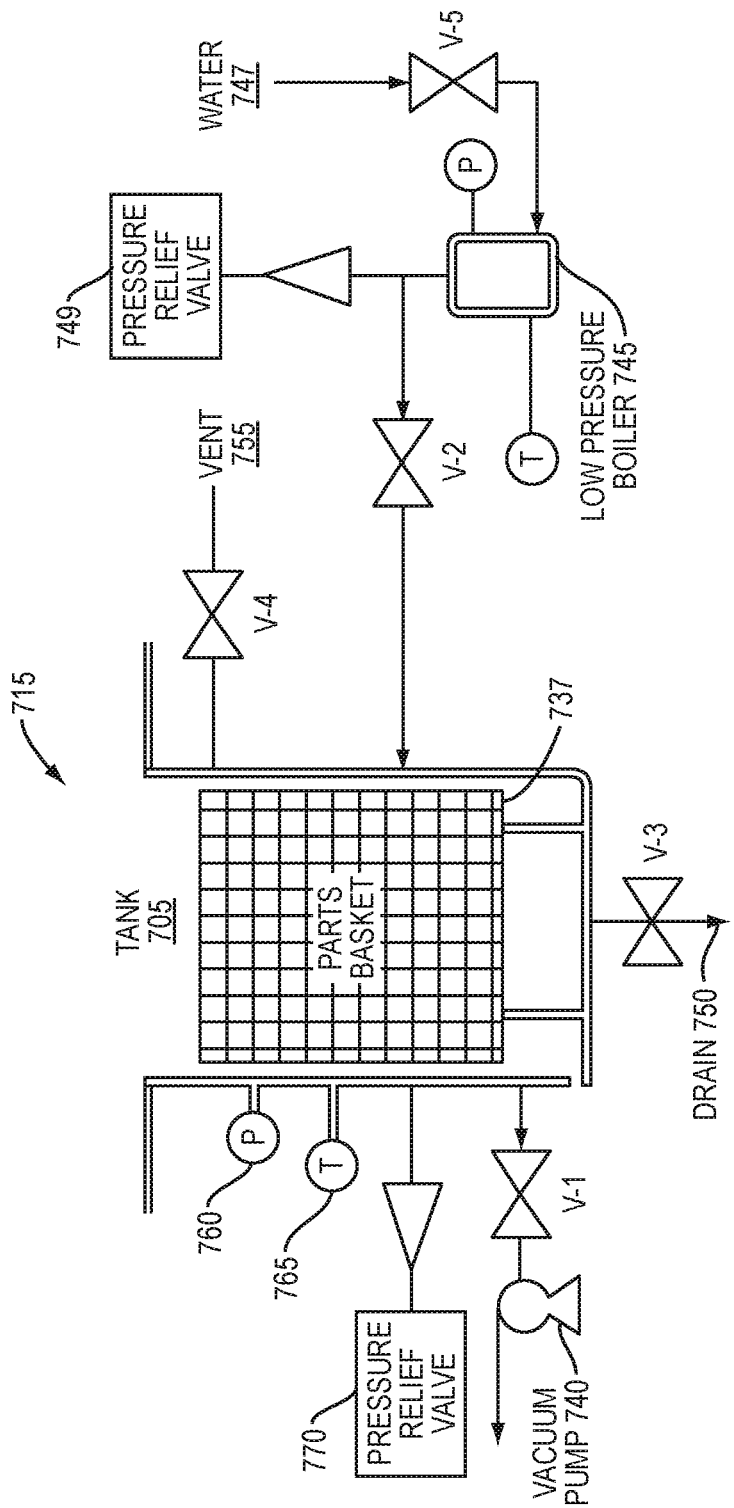
Figure 7C:
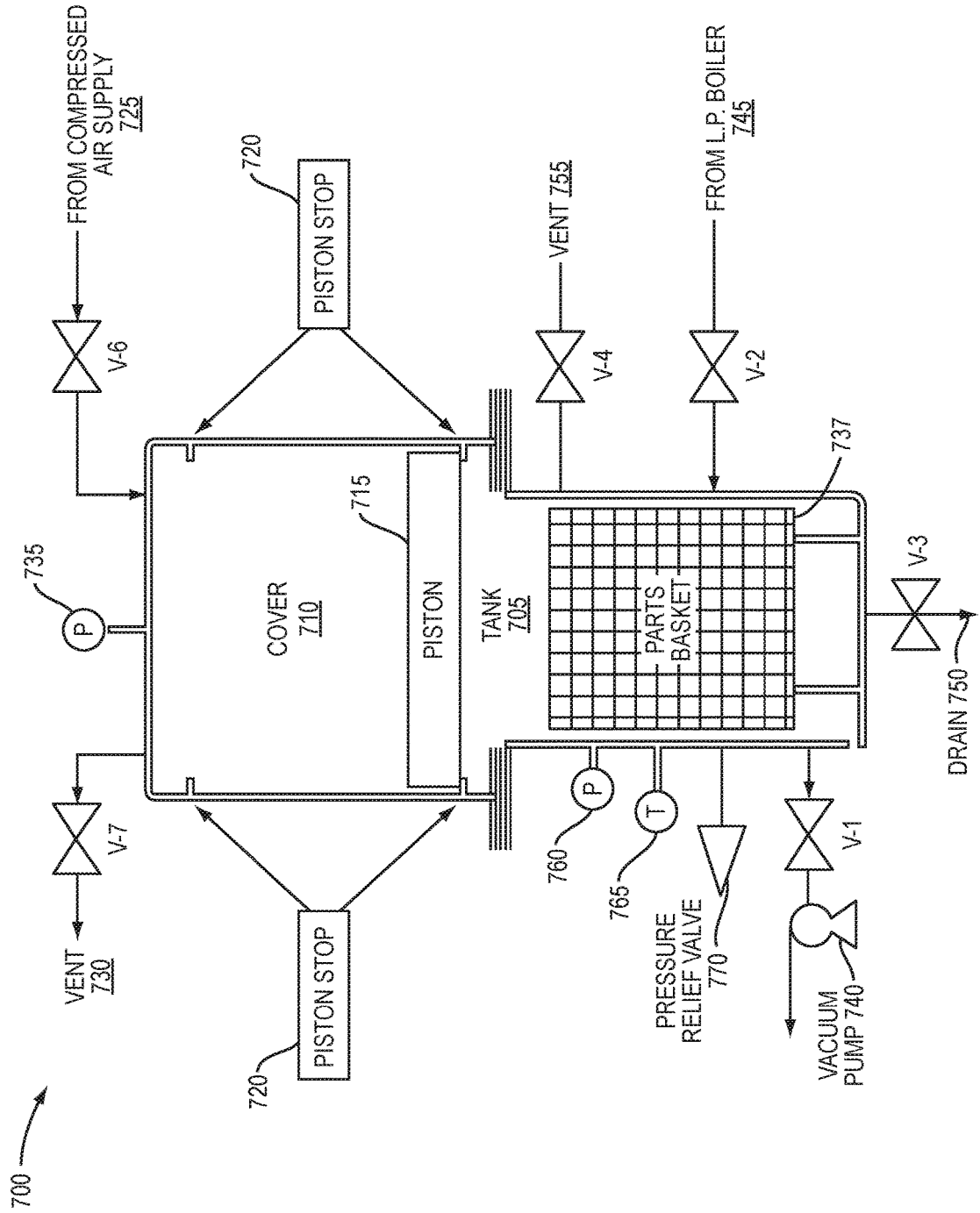

Various systems may be used to implement the first embodiment that involves pressure changes. FIGS. 7A-7C are schematic diagrams of an example system 700 for vapor condensation thermoplastic part finishing that may implement the sequence of steps 600 of FIG. 6. At the core of the system 700 is a reactor that includes a tank 705 (e.g., a cylindrical vessel) and a cover 710 (e.g., a domed, cylindrical assembly) that fits over an opening 715 in the tank, being fastened in place to isolate the reactor from atmosphere. FIG. 7A focuses on the cover 710 and structures attached thereto. FIG. 7B focuses on the tank 705 and structures attached thereto. FIG. 7C illustrates the combination of the tank 705 and the cover 710.

Referring to FIG. 7A, the cover 710 includes a piston 715 (e.g., a rigid plate whose diameter is slightly smaller than the diameter of the cover) that is free to move inside the cover between a pair of piston stops 720 disposed near a top end and a bottom end of the cover (e.g., ring-shaped stops). A space is defined between the piston 715 and the top end of the cover 710, which includes two valved ports: an air supply port regulated by valve V-6 coupled to a compressed air supply 725, and a vent port regulated by valve V-7 coupled to a vent line 730 that leads to atmosphere. The pressure in the space above the piston may be measured by a pressure sensor 735.

Referring to FIGS. 7B and 7C, the tank 705 includes a parts basket 737 (e.g., an open wire mesh basket that sits above the bottom of the tank) that is designed to hold a single or multiple parts. The dimensions of the tank may be determined based on the dimensions of the parts basket 737 and that in turn by the parts it needs to hold. The tank 705 includes four valved ports: an vacuum port regulated by valve V-1 coupled to a vacuum pump 740, and a boiler port regulated by valve V-2 coupled to a low-pressure boiler 745, a drain port (preferably disposed at a lowest point in the tank) regulated by valve V-3 coupled to a drain 750, and a vent port regulated by valve V-4 coupled to another vent line 755 that leads to atmosphere. The tank may also include a pressure sensor 760, a temperature sensor 765 and a pressure release valve 770 that releases excess pressure by venting gas to the atmosphere.

The low-pressure boiler 745 may be any of a variety of commercially available boilers (e.g., a Chromalox® low-pressure generator that delivers 9 to 45 pounds (lb) of non-hazardous vapor (e.g., water vapor) per hour at 0-90 pounds per square in gauge (psig)). The low-pressure boiler 745 may include an integral valve or a separate valve V-5 may be provided, coupled to a water supply line 747. Generating non-hazardous vapor (e.g., water vapor) at pressures less than 90 psig eliminates many safety issues associated with boilers that operate at significantly higher pressures, rendering the system 700 better suited for a design environment. To provide further safety, an additional pressure relief valve 749 may be provided.

The vacuum pump 740 may be any of a variety of commercially available vacuum pumps that is capable of lowering the air pressure in the reactor from 1 bar to less than 10 mbar, preferable in an elapsed time of 5 minutes or less.

The system 700 of FIGS. 7A-7C may be utilized to implement vapor condensation thermoplastic part finishing involving pressure changes. FIG. 8 is a table showing the status of components of the system of FIGS. 7A-7C in various system states. Initially, the system 700 is in an Off-Line state. The tank 705 of the reactor is closed with the cover 710 in place, all valves V-1 to V-7 are closed and the low-pressure boiler 745 and low-pressure boiler 745 are powered off. Thereafter, the system 700 enters a Standby state. The low-pressure boiler 745 is filled with water, for example, by opening valve V-5 (or an integral valve if present) and powered on to produce saturated non-hazardous vapor (e.g., water vapor) at a desired pressure and temperature. Valves V-4 and V-7 are opened to vent the reactor to atmosphere. Then, in an operation that generally corresponds to part of step 610 of FIG. 6, the system enters Load Parts state. The cover 710 is removed to open the tank 705 of the reactor. A user loads a thermoplastic part (or multiple parts) into the parts basket 737. Valve V-5 (or the integral valve is present) is closed. Next, in an operation that also may be part of step 610 of FIG. 6, the system enters a Close Tank state. The user puts the cover 710 in place and valves V-4 and V-7 to the vent lines are closed to vent the reactor to atmosphere.

Subsequently, in an operation that generally corresponds to step 620 of FIG. 6, the system enters an Evacuate Tank state. Valve V-1 is opened and the vacuum pump 740 is activated to decompress (evacuate) the reactor to a residual pressure of less than 10 mbar. Thereafter, in an operation that generally corresponds to step 630 of FIG. 6, the system enters a Preheat Tank state. Valve V-2 is opened to admit non-hazardous vapor (e.g., water vapor) from the low-pressure boiler 745 into the tank 705 of the reactor and the cover 710 below the piston 715. The piston 715 is moved from a bottom position against the bottom stop to a top position against the top stop due to the difference in pressure between the non-hazardous vapor (e.g., water vapor) admitted below the piston 715 and residual air above the piston 715. Vent V-5 may be opened to vent the residual air above the piston 715 to atmosphere. Valve V-2 is closed once the reactor has reached a steady-state temperature lower than the melting temperature of the thermoplastic part.

Further, in an operation that generally corresponds to step 640 of FIG. 6, the system enters a Polish Parts state. Valve V-6 is opened to admit high-pressure air into the cover 710 above the piston 715. This causes the piston 715 to move rapidly from against the top stop to the bottom stop, rapidly compressing the non-hazardous vapor in the reactor. The non-hazardous vapor is compressed from the steady-state pressure to a greater pressure sufficient to cause the non-hazardous vapor to condense on a surface of the thermoplastic part at a target temperature higher than its melting point, thereby heating, melting and reflowing its surface to improve its smoothness and color saturation. After a predetermined cycle time, valve V-6 is closed.

Thereafter, in an operation that generally corresponds to step 650 of FIG. 6, the system enters a Cool and Dry Parts state. Valves V-3 and V-7 are opened to reduce (evacuate) the pressure in the reactor to atmospheric pressure. Compressed nonhazardous vapor and condensate in the tank 705 drain through valve V-3. The rapid des compression causes the condensed non-hazardous vapor on the surface of the thermoplastic part to evaporate, rapidly cooling the thermoplastic part to below its melting temperature (preferably below its glass-transition temperature) and drying it. Compressed air above the piston 715 is vented to atmosphere through valve V-7.

The Polish Parts and Cool and Dry Parts states may be cycled between one or more times (i.e. just once or repeated) until a smoothness and/or color saturation is achieved. Finally, in an operation that generally corresponds to step 660 of FIG. 6, the system 700 enters a Remove Parts state. After closing valve V-4 and opening valve V-4, a user removes the cover 710, allowing the parts basket 737 to be accessed and the finished thermoplastic part removed from the reactor. The system 700 is now ready to accept one or more additional thermoplastic parts for finishing, and the steps repeated.

The system 700 of FIGS. 7A-7C may be constructed according to a number of design parameters. FIG. 9 is a table 900 showing the effect of steam pressure on operating temperatures and adiabatic heat generation in an example 1 cubit foot (ft$^3$) reactor with a 4× compression ratio. FIG. 10 is a table 1000 showing estimated heat requirements for the example reactor of FIG. 9.

In a second example embodiment, condensation and, where applicable evaporation, may be promoted by exposure of the part to a separately-heated cloud of nonhazardous vapor, and then removing such exposure. This may be performed by suspending the thermoplastic part in a vapor cloud above a pool of heated (e.g., boiling) nonhazardous liquid (e.g., water, a perfluorocarbon, a hydrocarbon ether, a perfluoropolyether, etc.) for a predetermined cycle time, and then moving the part to a cooler area. The vapor may be maintained at a constant pressure (e.g., atmospheric pressure) throughout the process. Alternatively, this may be performed by injecting superheated nonhazardous liquid to create a vapor cloud about a suspended thermoplastic part for a predetermined cycle time, and then ceasing the injection. The vapor cloud may be maintained at a constant pressure (e.g., at atmospheric pressure) while about the thermoplastic part.

Since pressure is maintained constant, the target temperature may be achieved by selection of the an appropriate nonhazardous vapor. FIG. 11 is a table 1100 showing the melting point for various example thermoplastics, target temperate ranges based on such melting points and examples of commercially available liquids that have a boiling point suitable for the target range at atmospheric pressure. In general, liquids that have a boiling point 20° C. to 40° C. higher than the melting points are suitable.

Figure 12:
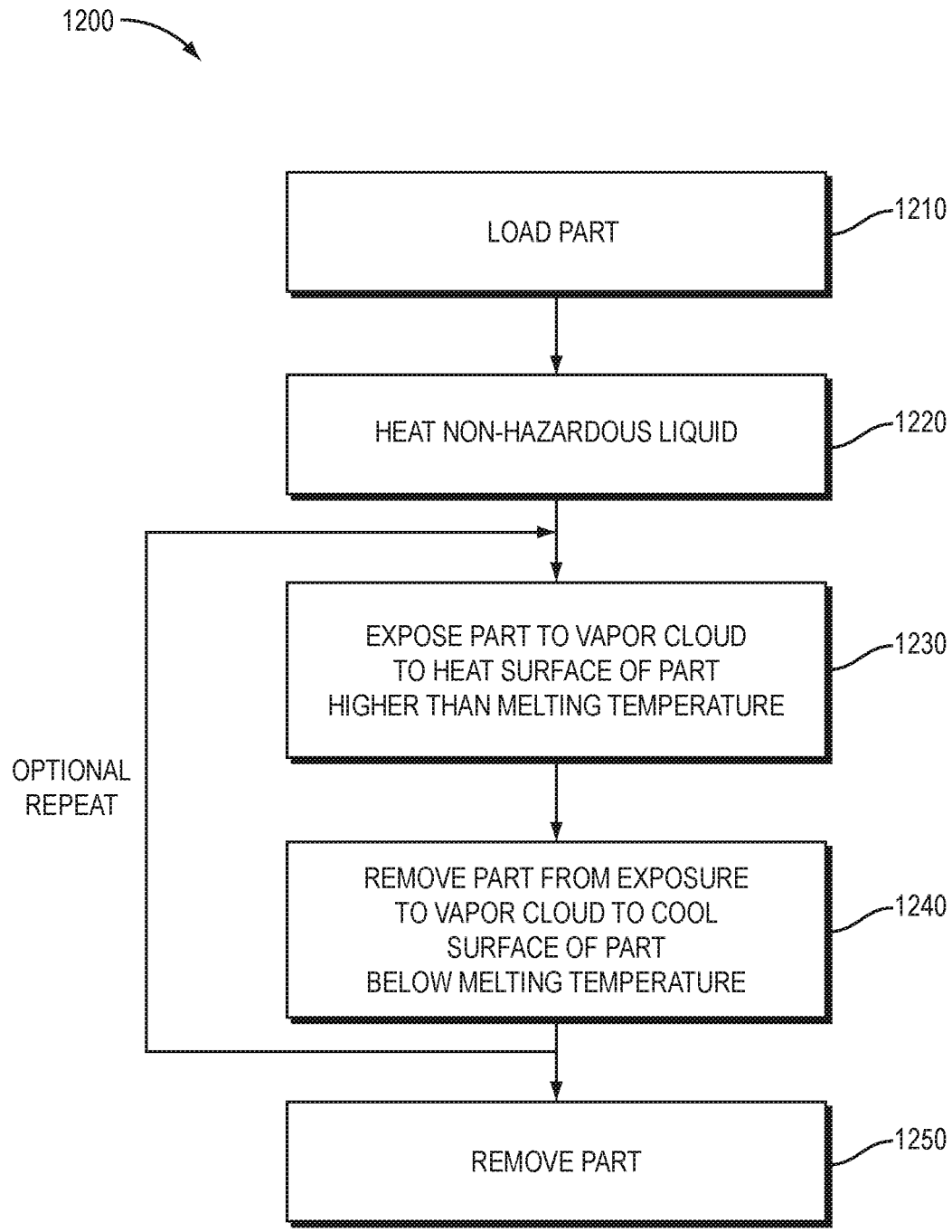
FIG. 12 is a flow diagram of an example high-level sequence of steps for vapor condensation thermoplastic part finishing according to a second embodiment that involves exposure of the part to a separately-heated cloud of non-hazardous vapor.

FIG. 12 is a flow diagram of an example high-level sequence of steps 1200 for vapor condensation thermoplastic part finishing according to a second embodiment that involves exposure of the part to a separately-heated cloud of nonhazardous vapor. At step 1210, a user loads a thermoplastic part into the reactor or a parts basket thereof. At step 1220, a non-hazardous liquid (e.g., water, a perfluorocarbon, a hydrocarbon ether, a perfluoropolyether, etc.) is heated. Depending on the implementation, the nature of the heating may vary. For example, a pool of non-hazardous liquid may be boiled at atmospheric pressure. Alternatively, a non-hazardous liquid may be preheated in a pool at atmospheric pressure to a temperature below its boiling point at atmospheric pressure and then superheated under higher pressure to above its boiling point at atmospheric pressure. At step 1230, the thermoplastic part is exposed to a vapor cloud resulting from the heating for a predetermined cycle time. Nonhazardous vapor condenses on a surface of the thermoplastic part at a target temperature higher than its melting temperature. The surface of the thermoplastic part exposed to the hot condensed vapor rapidly heats, melts and reflows, improving its smoothness and color saturation. Depending on the implementation, the exposure to hot nonhazardous vapor may vary. For example, the thermoplastic part may be moved into a vapor cloud above a pool of boiling non-hazardous liquid. Alternatively, superheated non-hazardous liquid may be injected about a stationary thermoplastic part to create a vapor cloud around it.

At step 1240, the thermoplastic part is removed from exposure to the vapor cloud, such that surface of the thermoplastic part cools to below its melting temperature (preferably below its glass-transition temperature). Depending on the implementation, the removal may vary. For example, the thermoplastic part may be moved out of the vapor cloud above a pool of boiling non-hazardous liquid and into a cooler area Alternatively, the thermoplastic part may remain stationary and injection of superheated nonhazardous liquid may cease, such that that thermoplastic part cools in place.

Steps 1230 and 1240 may be performed one or more times (i.e. just once or repeated) until a smoothness and/or color saturation of the part satisfies a predetermined design requirement. At step 1250, the user removes the finished thermoplastic part from the reactor or parts basket thereof.

Figure 13:
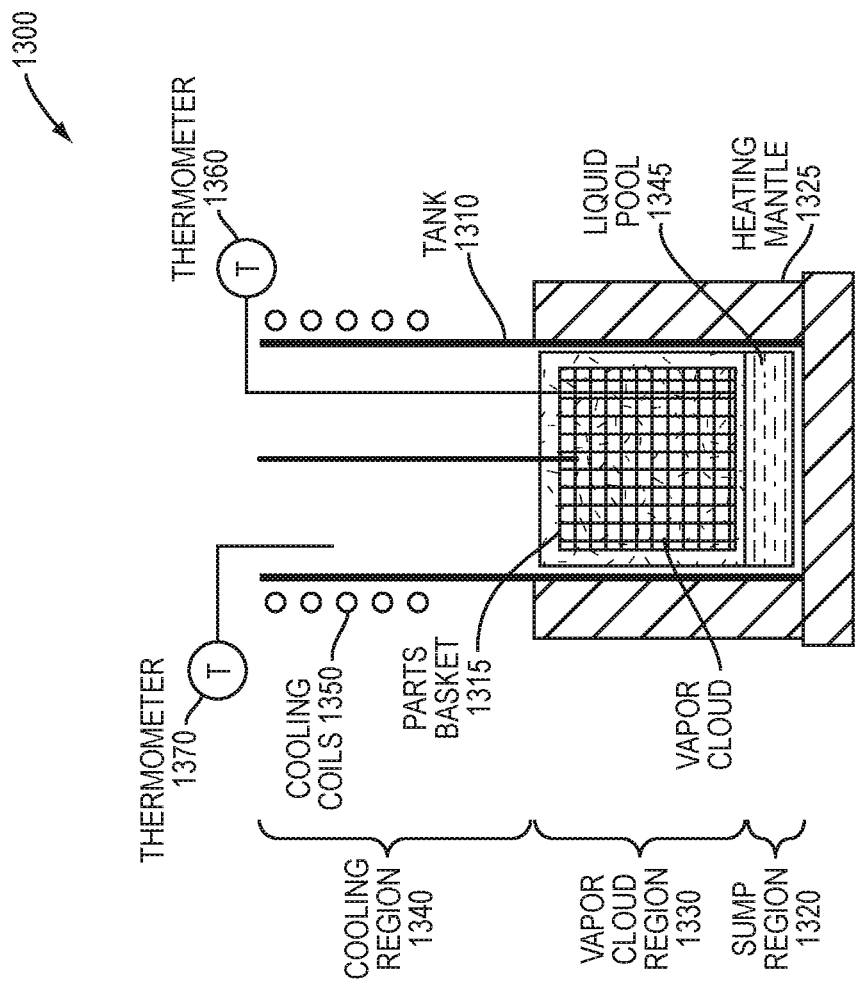
FIG. 13 is a schematic diagram of a first example system for vapor condensation thermoplastic part finishing that may implement the sequence of steps of FIG. 12.

Various systems may be used to implement the second embodiment that involves exposure of the part to a separately-heated cloud of nonhazardous vapor. FIG. 13 is a schematic diagram of a first example system 1300 for vapor condensation thermoplastic part finishing that may implement the sequence of steps 1200 of FIG. 12. At the core of the system 1300 is a reactor that includes a tank 1310 in which a parts basket 1315 (e.g., an open wire mesh basket that sits above the bottom of the tank) that is designed to hold a single or multiple parts is suspended. The dimensions of the tank may be determined based on the dimensions of the parts basket and that in turn by the parts it needs to hold.

The tank 1310 includes three regions: a sump region 1320 in which a pool 1345 of nonhazardous liquid is disposed; a vapor cloud region 1330; and a cooling region 1340. The sump region 1320 and/or vapor cloud region 1330 may include a heating assembly, for example, a heating mantel 1325. The cooling region 1340 may include cooling coils 1350. The top of the tank 1310 may be open to atmosphere. The pool 1345 of nonhazardous liquid is boiled by operation of the heating assembly to create a vapor cloud of hot nonhazardous vapor in the vapor cloud region 1330. Operation of the heating assembly may be regulated by a first thermometer 1360. Hot nonhazardous vapor that travels upward into the cooling region 1340 may re-condense and travel back down to the pool 1345, by dripping down the sides of the tank 1310 or by one or more dedicated condensate return lines (not shown), thereby suppressing loss of vapor into the atmosphere. The cooling coils 1350 may circulate a cooling fluid (e.g. cool water) with their operation regulated by a second thermometer 1370.

To finish a thermoplastic part, the parts basket 1315 may be lowered into the vapor cloud in the vapor cloud region 1330 so that nonhazardous vapor condenses on the surface of the thermoplastic part at a target temperature higher than its melting temperature, causing it to heat, melt and reflow. After a cycle time has elapsed, the parts basket 1315 may be raised into the cooling region 1340 so that the surface of the thermoplastic part cools to below its melting temperature (preferably below its glass-transition temperature). This process may be performed one or more times (i.e. just once or repeated).

Figure 14:
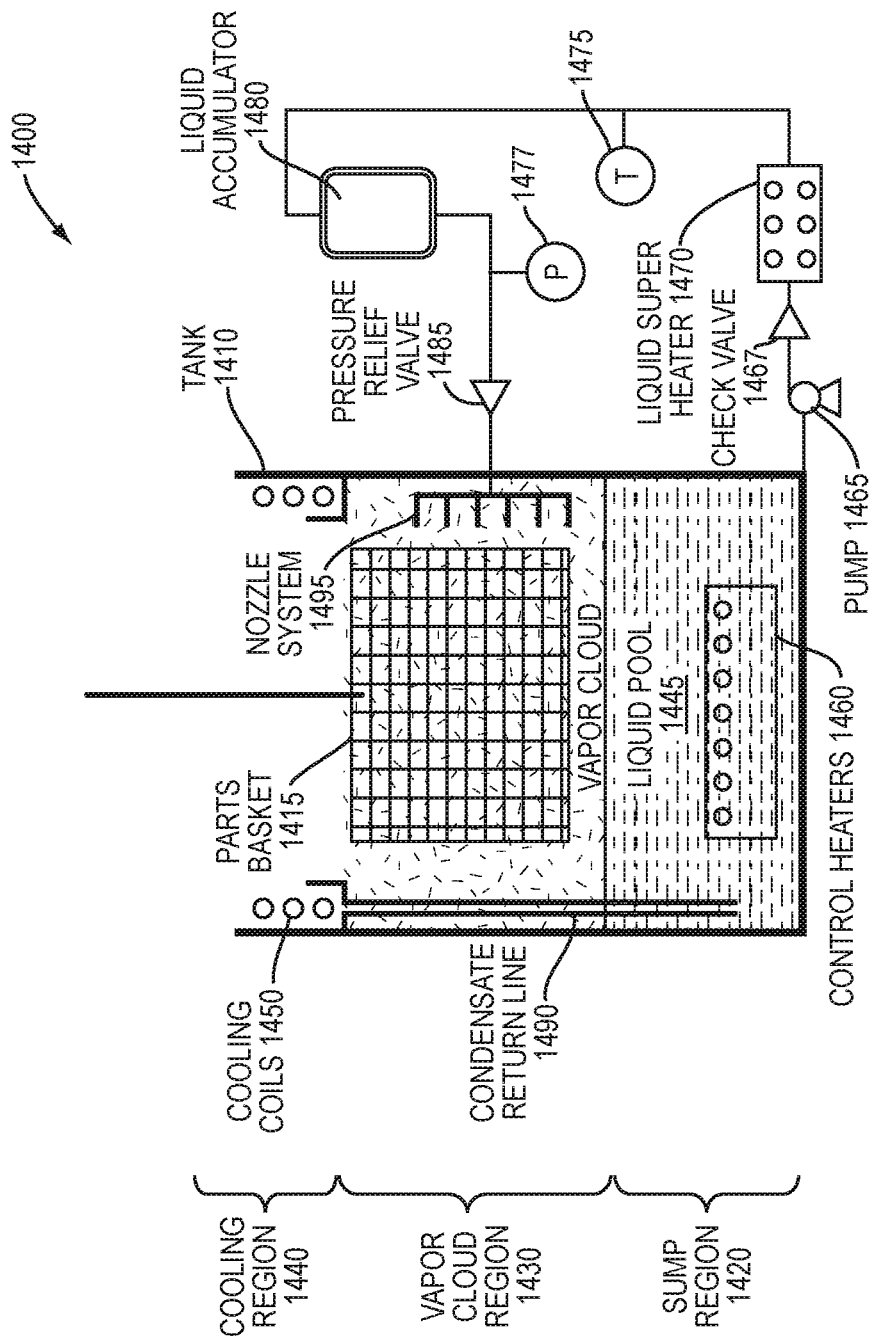
FIG. 14 is a schematic diagram of a second example system for vapor condensation thermoplastic part finishing that may implement the sequence of steps of FIG. 12.

FIG. 14 is a schematic diagram of a second example system 1400 for vapor condensation thermoplastic part finishing that may implement the sequence of steps 1200 of FIG. 12. Again, at the core of the system 1400 is a reactor that includes a tank 1410 in which a parts basket 1415 that is designed to hold a single or multiple parts is suspended. The dimensions of the tank may be determined based on the dimensions of the parts basket and that in turn by the parts it needs to hold. The tank 1410 includes three regions: a sump region 1420 in which a pool 1445 of nonhazardous liquid is disposed; a vapor cloud region 1430 in which the parts basket 1415 is disposed when the system is in use; and a cooling region 1440 having cooling coils 1450. The top of the tank may be open to atmosphere.

The pool 1445 of nonhazardous liquid disposed in the sump region 1420 is preheated to a temperature below its boiling point at atmospheric pressure and then superheated to above its boiling point at atmospheric pressure by a heating assembly. The heating assembly may include control heaters 1460 that preheat the liquid in the pool 1445, a pump 1465 and a a check valve 1467 that draw the preheated liquid and a liquid super heater 1470 that further heats the liquid under higher pressure. Superheated nonhazardous liquid may be stored in a liquid accumulator 1480. Operation of the liquid superheater 1470 may be regulated by temperature and pressure sensors 1475, 1477.

To finish a thermoplastic part, the parts basket 1415 may be lowered into the vapor cloud region 1430 and then held stationary. Superheated nonhazardous liquid is injected via a nozzle system 1480 connected through a pressure relief valve 1485 into the vapor cloud region 1430 for a predetermined cycle time. The nonhazardous vapor condenses on the surface of the thermoplastic part at a target temperature higher than its melting temperature, causing it to heat, melt and reflow. After the cycle time has elapsed, the injection may cease, so that the surface of the thermoplastic part cools to below its melting temperature (preferably below its glass-transition temperature). Hot nonhazardous vapor that travels upward into the cooling region 1440 may re-condense and travel back down to the pool 1445, by one or more dedicated condensate returns 1490, thereby suppressing loss of vapor into the atmosphere. To promote cooling, cooling coils 1450 may circulate a cooling fluid (e.g. cool water). This process may be performed one or more times (i.e. just once or repeated). After all cycles have completed, the parts basket 1415 may be raised and the part removed.

With the systems of FIG. 13 and FIG. 14, a finished thermoplastic part may still be coated with a thin film of nonhazardous liquid, that may need to be removed for performance and aesthetic considerations. If a nonhazardous liquid with a low vapor pressure at room temperature is utilized, special procedures may be required to remove the film. For example, the finished thermoplastic part may be subject to a vapor degreaser that operates with a low boiling point fluorinated liquid to remove (and potentially recover) the remaining nonhazardous liquid.

The foregoing has been a detailed description of several embodiments for thermoplastic part finishing utilizing condensation of a nonhazardous vapor. Further modifications and additions may be made without departing from the disclosure's intended spirit and scope. For example, while it is discussed above that in one embodiment movement of a piston internal to the reactor may be used to compress and decompress the nonhazardous vapor, it should be understood that other compression and decompression mechanisms may alternatively be used, including external compressors, pressure vessels, pumps, and the like. Likewise, while several example non-hazardous liquids/vapors are discussed above, it should be remembered that a variety of other non-hazardous substances may alternatively be used, including various polyglycols, polysilicones and other high boiling point substances below their combustion point. Accordingly, it should be remembered that the above descriptions are meant to be taken only by way of example, and the invention is not restricted to any one particular embodiment, configuration or implementation discussed above. Rather, the invention is defined by the following claims.

What is claimed is:

1. A method for vapor condensation thermoplastic part finishing comprising:

heating a surface of a thermoplastic part in a reactor to a first temperature higher than a melting temperature of the thermoplastic part by condensing a non-hazardous vapor on the surface of the thermoplastic which raises the temperature of the surface to the first temperature, the heating causing the surface of the thermoplastic part to melt and reflow;

cooling the surface of the thermoplastic part to a second temperature lower than the melting temperature by evaporating the condensed non-hazardous vapor on the surface of the thermoplastic part which lowers the temperature of the surface of the thermoplastic part to the second temperature; and performing the heating and cooling for one or more cycles until the thermoplastic part has at least one of a roughness or a color saturation that satisfies a predetermined requirement.

2. The method of claim 1, wherein the heating further comprises:

compressing the non-hazardous vapor to a first pressure sufficient to cause the non-hazardous vapor to condense on the surface of the thermoplastic part at the first temperature that is higher than a melting temperature of the thermoplastic part.

3. The method of claim 2, wherein the cooling further comprises:

decompressing the non-hazardous vapor to a second pressure sufficient to cause the condensed non-hazardous vapor on the surface of the thermoplastic part to evaporate and thereby cool the surface of the thermoplastic part to the second temperature.

4. The method of claim 3, wherein the reactor includes a tank configured to hold the thermoplastic part and a movable piston, and wherein the compressing comprises:

moving the movable piston from a first position to a second position to compress the non-hazardous vapor.

5. The method of claim 4, wherein the decompressing further comprises:

moving the movable piston from the second position to the first position to decompress the non-hazardous vapor.

6. The method of claim 4, wherein the decompressing further comprises:

opening a valve to vent the non-hazardous vapor to atmosphere.

7. The method of claim 4, wherein the moving the movable piston is performed by applying force to the movable piston by pressurized air.

8. The method of claim 1, wherein the heating further comprises exposing the thermoplastic part to separately-heated non-hazardous vapor to cause the non-hazardous vapor to condense on the surface of the thermoplastic part at the first temperature that is higher than a melting temperature of the thermoplastic part.

9. The method of claim 8, wherein the exposing further comprises:

moving the thermoplastic part into a vapor cloud of non-hazardous vapor disposed in a region of a reactor.

10. The method of claim 8, wherein the exposing further comprises injecting superheated non-hazardous liquid to create a vapor cloud about the thermoplastic part in a region of a reactor.

11. The method of claim 8, wherein the cooling further comprises:

removing the thermoplastic part from exposure to the separately-heated nonhazardous vapor.

12. The method of claim 11, wherein the removing further comprises:
moving the thermoplastic part out of a vapor cloud of non-hazardous vapor disposed in a region of a reactor.

13. The method of claim 11, wherein the removing further comprises
ceasing injection of superheated non-hazardous liquid to allow a vapor cloud about the thermoplastic part in a region of a reactor to dissipate.

14. The method of claim 1, wherein the non-hazardous vapor is water vapor.

15. The method of claim 1, wherein the non-hazardous vapor is a perfluorocarbon vapor, a hydrocarbon ether vapor, or a perfluoropolyether vapor.

16. The method of claim 1, wherein the one or more cycles are two or more cycles.

17. The method of claim 1, wherein the thermoplastic part is constructed from a thermoplastic selected from the group consisting of acrylonitrile butadiene styrene (ABS), nylon, polylactic acid (PLA), acrylonitrile styrene acrylate (ASA), polyether ether ketone (PEEK), polyether ether ketone ketone (PEKK), polyetherimide (PEI), thermoplastic elastomer (TPE) and thermoplastic polyurethane (TPU).

18. The method of claim 1, wherein the thermoplastic part is constructed from a thermoplastic that has a melting temperature that is in the range of from 50° C. to 400° C.

19. The method of claim 1, further comprising:
forming the thermoplastic part by three-dimensional (3D) printing.

20. A method for vapor condensation thermoplastic part finishing comprising:
heating a surface of a thermoplastic part in a reactor to a first temperature higher than a melting temperature of the thermoplastic part by compressing a nonhazardous vapor to a first pressure sufficient to cause the non-hazardous vapor to condense on the surface of the thermoplastic part which raises the temperature of the surface to the first temperature, the heating causing the surface of the thermoplastic to melt and reflow;
cooling the surface of the thermoplastic part to a second temperature lower than the melting temperature by decompressing the non-hazardous vapor to a second pressure sufficient to cause the condensed non-hazardous vapor on the surface of the thermoplastic part to evaporate which lowers the temperature of the surface of the thermoplastic to the second temperature; and
performing the heating and cooling for one or more cycles until the thermoplastic part has at least one of a roughness or a color saturation that satisfies a predetermined requirement,
wherein the non-hazardous vapor is a vapor of a liquid other than a plastic solvent for thermoplastic.

21. The method of claim 20, wherein the non-hazardous vapor is water vapor.

22. The method of claim 20, wherein the reactor includes a tank configured to hold the thermoplastic part and a movable piston, and wherein the compressing comprises moving the movable piston from a first position to a second position to compress the non-hazardous vapor, and the decompressing comprises moving the movable piston from the second position to the first position to decompress the nonhazardous vapor.

23. The method of claim 20, wherein the one or more cycles are two or more cycles.

24. A method for vapor condensation thermoplastic part finishing comprising:
heating a surface of a thermoplastic part in a reactor to a first temperature higher than a melting temperature of the thermoplastic part by exposing the thermoplastic part to separately-heated non-hazardous vapor which condenses on the surface of the thermoplastic part and raises the temperature of the surface of the thermoplastic part to the first temperature, the heating causing the surface of the thermoplastic part to melt and reflow;
cooling the surface of the thermoplastic part to a second temperature lower than the melting temperature by removing the thermoplastic part from exposure to the separately-heated non-hazardous vapor which cause the condensed non-hazardous vapor on the surface of the thermoplastic part to evaporate and lowers the temperature of the surface of the thermoplastic to the second temperature; and
performing the heating and cooling for one or more cycles until the thermoplastic part has at least one of a roughness or a color saturation that satisfies a predetermined requirement,
wherein the non-hazardous vapor is a vapor of a liquid other than a plastic solvent for thermoplastic.

25. The method of claim 24, wherein the non-hazardous vapor is water vapor.

26. The method of claim 24, wherein the exposing comprises injecting superheated non-hazardous liquid to create a vapor cloud about the thermoplastic part in a region of a reactor and the removing comprises ceasing injection of superheated nonhazardous liquid to allow the vapor cloud about the thermoplastic part in a region of a reactor to dissipate.

27. The method of claim 25, wherein the one or more cycles are two or more cycles.

* * * * *

UNITED STATES PATENT AND TRADEMARK OFFICE
CERTIFICATE OF CORRECTION

| | |
|---|---|
| PATENT NO. | : 11,407,147 B1 |
| APPLICATION NO. | : 16/897888 |
| DATED | : August 9, 2022 |
| INVENTOR(S) | : Robert Kaiser |

It is certified that error appears in the above-identified patent and that said Letters Patent is hereby corrected as shown below:

On the Title Page

(73) Assignee reads:
"(73) Assignee: Entropie Systems, Inc., Edmonds, WA (US)"
Should read:
--(73) Assignee: Entropic Systems, Inc., Edmonds, WA (US)--

In the Specification

Column 5, Line 21 reads:
"below, the nonhazardous vapor may be caused to condense"
Should read:
--below, the non-hazardous vapor may be caused to condense--

Column 6, Line 34 reads:
"than 10 mbar). At stop 630, a nonhazardous vapor (e.g.,"
Should read:
--than 10 mbar). At step 630, a non-hazardous vapor (e.g.,--

Column 6, Line 51 reads:
"nonhazardous vapor on the surface of the thermoplastic part"
Should read:
--non-hazardous vapor on the surface of the thermoplastic part--

Column 8, Line 49 reads:
"nonhazardous vapor and condensate in the tank 705 drain"
Should read:
--non-hazardous vapor and condensate in the tank 705 drain--

Signed and Sealed this
Thirteenth Day of June, 2023

*Katherine Kelly Vidal*
Katherine Kelly Vidal
*Director of the United States Patent and Trademark Office*

CERTIFICATE OF CORRECTION (continued)
U.S. Pat. No. 11,407,147 B1

Column 8, Line 50 reads:
"through valve V-3. The rapid des compression causes the"
Should read:
--through valve V-3. The rapid decompression causes the--

Column 11, Line 50 reads:
"decompress the nonhazardous vapor, it should be understood"
Should read:
--decompress the non-hazardous vapor, it should be understood--

In the Claims

Claim 11:
Column 13, Line 2 reads:
"separately-heated nonhazardous vapor."
Should read:
--separately-heated non-hazardous vapor.--

Claim 20:
Column 13, Line 35 reads:
"thermoplastic part by compressing a nonhazardous"
Should read:
--thermoplastic part by compressing a non-hazardous--

Claim 22:
Column 14, Line 13 reads:
"nonhazardous vapor."
Should read:
--non-hazardous vapor.--

Claim 26:
Column 14, Line 46 reads:
"superheated nonhazardous liquid to allow the vapor cloud"
Should read:
--superheated non-hazardous liquid to allow the vapor cloud--